US005787693A

United States Patent [19]

Dyke

[11] Patent Number: 5,787,693
[45] Date of Patent: Aug. 4, 1998

[54] UNIVERSAL, RETROFITTABLE POWERHEAD FOR SMALL GASOLINE ENGINE POWER IMPLEMENTS

[75] Inventor: Colin Dyke, North Augusta, Canada

[73] Assignee: Black & Decker Inc., Newark, Del.

[21] Appl. No.: 331,385

[22] Filed: Oct. 28, 1994

[51] Int. Cl.$^6$ ............................................. A01D 34/78
[52] U.S. Cl. .............................. 56/11.9; 56/2; 56/DIG. 9
[58] Field of Search ........................ 56/11.9, 2, 1, 16.7, 56/12.1, 12.7, DIG. 9; 123/198 E, 195 R; 30/276; 320/2

[56] References Cited

U.S. PATENT DOCUMENTS

| | | |
|---|---|---|
| Re. 24,594 | 1/1959 | Smith . |
| D. 260,394 | 8/1981 | Tuggle . |
| 2,137,921 | 11/1938 | Matthews . |
| 2,621,463 | 12/1952 | Skillman . |
| 2,630,185 | 3/1953 | Adams . |
| 2,631,800 | 3/1953 | Pinkston . |
| 2,734,325 | 2/1956 | LaBonte . |
| 2,740,907 | 4/1956 | Dannenmann . |
| 2,841,723 | 7/1958 | Corbett . |
| 3,212,244 | 10/1965 | Wilgus . |
| 3,420,042 | 1/1969 | Kaufman . |
| 3,603,162 | 9/1971 | Gohler . |
| 3,623,305 | 11/1971 | Freedlander et al. . |
| 3,945,116 | 3/1976 | Hardin, Jr. . |
| 4,023,332 | 5/1977 | Achenbach et al. . |
| 4,064,680 | 12/1977 | Fleigle . |
| 4,145,864 | 3/1979 | Brewster, Jr. . |
| 4,176,508 | 12/1979 | Baumann et al. . |
| 4,250,623 | 2/1981 | Pittinger et al. . |
| 4,301,642 | 11/1981 | Thurber . |
| 4,333,302 | 6/1982 | Thomas et al. . |
| 4,356,686 | 11/1982 | Lessig, III . |
| 4,389,836 | 6/1983 | Lowry et al. ......................... 56/12.7 |
| 4,509,296 | 4/1985 | Rasmussen . |
| 4,587,800 | 5/1986 | Jimenez . |
| 4,631,455 | 12/1986 | Taishoff . |
| 4,781,014 | 11/1988 | Conboy, Jr. et al. . |
| 4,841,929 | 6/1989 | Tuggle et al. . |
| 4,870,811 | 10/1989 | Steele . |
| 4,882,896 | 11/1989 | Wilcox . |
| 4,987,729 | 1/1991 | Paytas . |
| 5,309,701 | 5/1994 | McGuerty . |

FOREIGN PATENT DOCUMENTS

| | | |
|---|---|---|
| 0 003 888 | 12/1981 | European Pat. Off. . |
| 0 009 027 | 8/1982 | European Pat. Off. . |
| 544830 | 2/1932 | Germany . |
| 1071401 | 12/1959 | Germany . |
| P2114983.7 | 10/1971 | Germany . |
| 7607575 | 9/1976 | Germany . |
| 1 215 151 | 12/1970 | United Kingdom . |
| 1 215 692 | 12/1970 | United Kingdom . |
| 1 524 973 | 9/1978 | United Kingdom . |
| WO9508256 | 3/1995 | WIPO . |

*Primary Examiner*—Terry Lee Melius
*Attorney, Agent, or Firm*—Harness, Dickey & Pierce, P.L.C.

[57] ABSTRACT

A universal powerhead apparatus which is securable to a frame portion of a land vehicle, pump or other tool to replace an existing internal combustion engine of the device without requiring significant modification to the frame portion of the device. The powerhead apparatus includes an electric motor and a universal mounting plate which is secured to a portion of the motor. The universal mounting plate has a footprint substantially similar to that of a specific make and displacement of internal combustion engine which the apparatus is intended to replace. The overall footprint of the apparatus is also similar to the specific make and displacement of a gasoline powered engine which it is designed to replace. The apparatus can be secured directly to a frame portion of a land vehicle, tool or pump in either a horizontal or vertical orientation to thus enable it to be used as a power source for vehicles requiring a horizontally disposed output shaft as well as vehicles requiring a vertically disposed output shaft. The apparatus may be assembled to the land vehicle, tool or pump in a factory or retrofitted to replace a specific make and displacement of gasoline powered engine. In one preferred embodiment, the apparatus is powered by at least one battery disposed within a housing thereof. In an alternative preferred embodiment, the apparatus is powered directly from an AC power source. The use of the apparatus completely eliminates the undesirable emissions produced by internal combustion engines and the periodic maintenance typically associated with such engines.

11 Claims, 4 Drawing Sheets

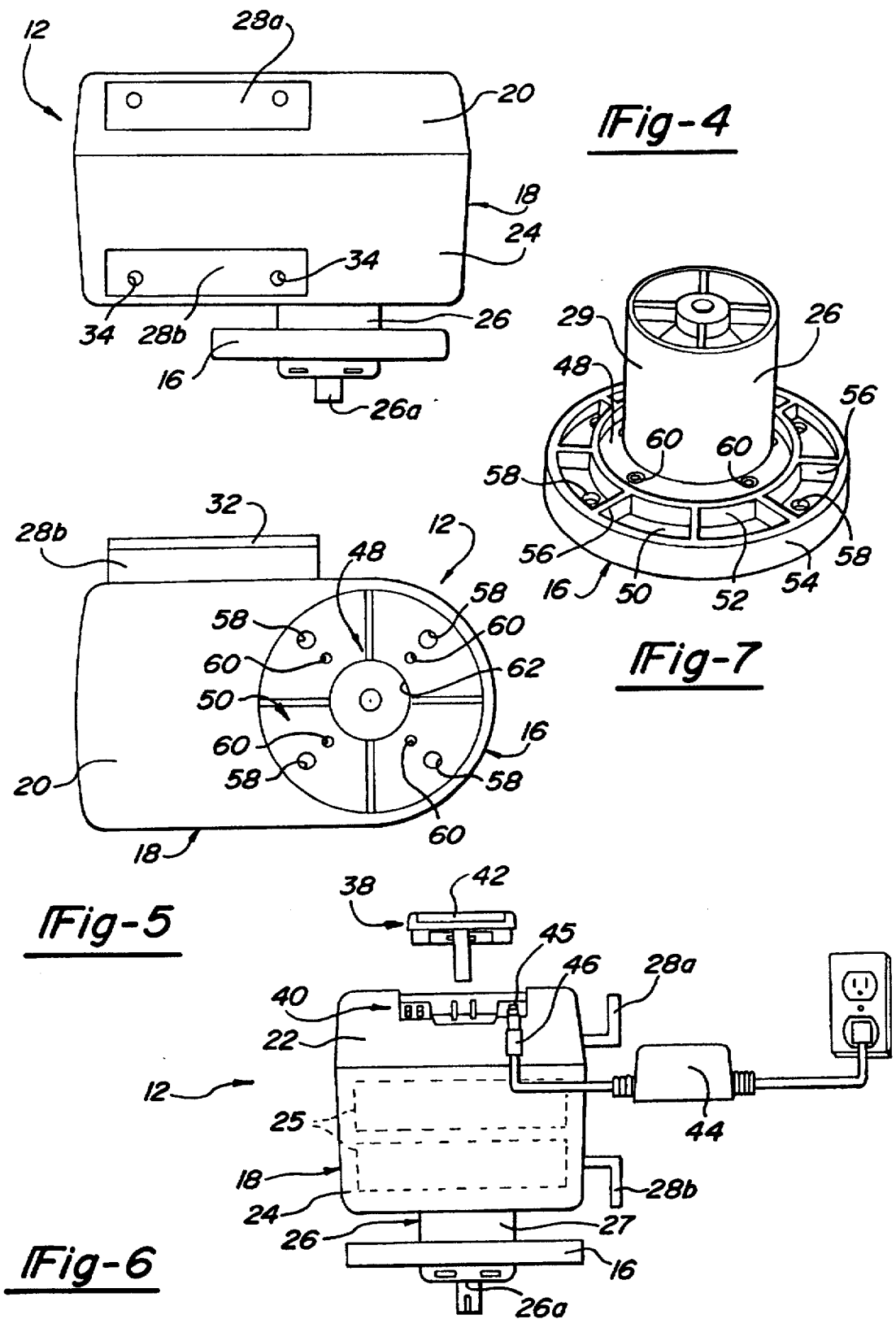

UNIVERSAL, RETROFITTABLE POWERHEAD FOR SMALL GASOLINE ENGINE POWER IMPLEMENTS

BACKGROUND OF THE INVENTION

1. Technical Field

This invention relates to electric motors for driving land vehicles such as lawn mowers, snow throwers, tillers, pumps and other tools, and more particularly to a universal powerhead employing an electric motor and a universal mounting plate for enabling the electric motor to be secured in place of an internal combustion engine of the land vehicle or tool without requiring modification to a frame portion thereof.

2. Discussion

Land vehicles such as lawn mowers, snow throwers, tillers, thatchers and other vegetation, gardening and agricultural-like products used in home or commercial environments, as well as many other forms of tools such as string trimmers, chain saws, leaf blowers, pumps, etc., have traditionally been used with internal combustion engines. The internal combustion engine provides power for either propelling the land vehicle over a ground surface or for driving one or more sub-components of the land vehicle or tool necessary for enabling the device to perform its intended purpose. Such internal combustion engines typically are relatively small displacement engines having a horsepower rating less than 10 and more typically less than 5. The footprint of an internal combustion engine manufactured by a certain manufacturer typically does not vary, or varies insignificantly, regardless of the form of land vehicle or tool with which the engine is used. This is provided that the displacement (horsepower rating) is the same for the particular engine under consideration. Put differently, the footprint of an internal combustion engine produced by a certain manufacturer and having a given horsepower rating will not vary depending upon the form of land vehicle or tool with which it is used. Thus, for example, every 3.5 horsepower internal combustion engine manufactured by a given manufacturer typically will have the same footprint regardless of the device with which it is used.

In most instances, the gasoline powered engine of a land vehicle will be vertically mounted such that the crankshaft of the engine is vertically positioned. The only exception is where the engine must be horizontally mounted. Such applications typically include those in connection with snow throwers, tillers, and like equipment which incorporate an element which is driven about a generally horizontally disposed axis of rotation. With these forms of land vehicles the engine is typically mounted such that its crankshaft extends generally horizontally rather than vertically. The overall footprint and outer dimensions of the engine, however, do not vary; only the manner in which the engine is mounted to the land vehicle (i.e., either vertically or horizontally). Thus, a manufacturer of various land vehicles may be able to use one internal combustion engine of a specific engine manufacturer on a wide variety of land vehicles or tools which it manufacturers and sells for various applications.

With the increasing attention to the environment, internal combustion engines have come under increasing scrutiny. Relatively small horsepower internal combustion engines typically used with land vehicles such as lawn mowers, snow throwers, tillers, thatchers, etc., produce a relatively high degree of emissions compared to, for example, present-day automobiles which include extensive pollution control equipment designed to reduce hydrocarbon emissions. In many instances, a relatively small internal combustion engine used with a land vehicle, for example a 3.5 horsepower engine, can produce a significantly higher degree of unwanted hydrocarbon emissions than the internal combustion engines used with present-day automobiles. With government regulation of air quality standards, and particularly of air pollution produced by motor driven or powered vehicles, it is anticipated that land vehicles having relatively small displacement internal combustion engines will come under increasing scrutiny in the years to come for the pollutants that such engines produce.

In view of the above, it would be highly desirable to be able to mount an electric power source, such as an electric motor, directly to a frame portion of a land vehicle or tool either during assembly of the land vehicle at a factory or thereafter by authorized personnel of the manufacturer of the land vehicle or tool, or other individuals. As will be appreciated, electric motors do not provide any airborne pollutants which negatively impact the atmosphere. With relatively recent advances in battery technology, batteries are now available which can power electric motors suitable to drive land vehicles such as lawn mowers, snow throwers, tillers, etc., for a continuous length of time in the range of about 20-45 minutes without adding significant weight or cost to the device over that of a conventional internal combustion engine. For many applications such as the mowing of residential lawns and clearing of snow on residential driveways, this running time is more than sufficient to enable the operator to cut a residential lawn or clear a residential driveway of snow on a battery single charge. Thus, electric motors are becoming increasingly popular for land vehicles and a wide variety of other tools used for various purposes where an extended running time of an hour or more is typically not need to accomplish the desired task.

While electric motors have therefore become common in many instances, many manufacturers of various forms of land vehicles still are relying primarily on the internal combustion engine as the exclusive means for powering one or more types of land vehicles or tools which they offer for sale. This is likely due, at least in part, to the belief of many manufacturers that it would be necessary to design an electric motor requiring a specific mounting assembly for each model of land vehicle offered by the manufacturer.

Thus, there is a need for an electric motor assembly having some form of universal mounting assembly which would allow the electric motor to be quickly and easily mounted to a frame of a land vehicle which was originally designed for an internal combustion engine, and to replace the internal combustion engine as the power source for the land vehicle. There is further a need for such an electric motor and mounting assembly which could be secured to a wide variety of land vehicles or tools in place of a specific make of internal combustion engine without requiring the manufacturer to modify a frame portion of a land vehicle beforehand.

Accordingly, it is a principal object of the present invention to provide an electric powerhead apparatus having an electric motor and a universal mounting plate. The universal mounting plate would allow the powerhead apparatus to be quickly and easily fitted to a wide variety of land vehicles or tools in place of a specific model of internal combustion engine originally used or intended for use with the land vehicle or tool, and without requiring a frame portion of the land vehicle or tool to be significantly modified to accept the powerhead apparatus in place of the internal combustion engine.

It is another object of the present invention to provide a powerhead apparatus having a universal mounting plate as well as a secondary mounting assembly for allowing the apparatus to be mounted in either a vertical orientation or a horizontal orientation with no modification to the apparatus and with little or no modification to the land vehicle or tool to which the powerhead apparatus is to be mounted in lieu of the original planned-for-use internal combustion engine.

It is still another object of the present invention to provide a universal powerhead apparatus which is standard for use with a wide variety of land vehicles and tools and which includes an overall footprint which is substantially similar to the internal combustion engine which it is designed to replace, such that the powerhead apparatus does not interfere with other component parts of the land vehicle or tool designed to be positioned in the near vicinity of the power source of the vehicle or tool.

It is still another object of the present invention to provide a universal powerhead apparatus having a mounting plate and a secondary mounting assembly, where the mounting plate is adapted to secure an electric motor of the apparatus such that the output shaft of the motor is orientated in a vertical position, and the secondary mounting assembly is adapted to secure the apparatus such that the output shaft is orientated in a horizontal position.

It is still another object of the present invention to provide a universal powerhead apparatus having a universal mounting plate and a secondary mounting assembly, where each of the universal mounting plate and secondary mounting assembly do not require adapters or other additional component parts to allow the powerhead apparatus to be secured to a variety of land vehicles or tools originally designed to be used with a specific internal combustion engine.

It is a further object of the present invention to provide a universal powerhead apparatus adapted to be used with a wide variety of land vehicles or tools in place of an internal combustion engine, where the apparatus includes an electric motor and a battery for powering the electric motor, as well as a battery charger interface assembly for allowing the battery of the apparatus to be quickly and easily recharged. It is still a further object to provide the powerhead apparatus with an interlock assembly which prevents the electric motor of the apparatus from being turned on while an external battery charger is secured to the charger interface circuitry and for preventing an external charger from being hooked-up to the charger interface circuitry while the electric motor of the apparatus is running.

SUMMARY OF THE INVENTION

The above and other objects are accomplished by a universal powerhead apparatus in accordance with the preferred embodiments of the present invention. The universal powerhead apparatus generally comprises a housing having an overall footprint substantially similar to a specific make of internal combustion engine, an electric motor disposed within the housing and a universal mounting plate secured to a portion of the motor. The universal mounting plate is adapted to be secured to a frame portion of a wide variety of land vehicles or tools without modification to the frame portion. This enables the powerhead apparatus to be substituted for an internal combustion engine of the land vehicle or tool while assembling the device at a factory or other like facility, or even retrofitted to the device to replace an internal combustion engine thereof with little or no modification to the placement of other components of the device.

It is still another object of the present invention to provide a universal powerhead apparatus adapted to be secured to a wide variety of land vehicles or tools, and which is adapted to be powered by an AC power source, and which further includes an interlock assembly which disables an electric motor of the apparatus when a portion of the interlock assembly is removed from the apparatus.

In one preferred embodiment the powerhead apparatus may be secured to a frame portion of a land vehicle or tool such that the electric motor of the apparatus is orientated vertically. In an alternative preferred embodiment of the apparatus, a secondary mounting assembly is included which allows the electric motor to be mounted to a frame portion of the land vehicle or tool such that the output shaft of the electric motor extends generally horizontally. In the first-described preferred embodiment, the vertical orientation of the output shaft of the motor allows the powerhead apparatus to be used with land vehicles such as lawn mowers which require a vertically orientated output shaft for driving a cutting blade. In the just-described alternative embodiment, the horizontal mounting of the apparatus allows the apparatus to be used with land vehicles having an implement required to be rotated about a horizontal axis. Such land vehicles may include snow throwers, tillers and thatchers.

In the preferred embodiments the universal powerhead apparatus has an overall footprint which is substantially similar to the specific make of internal combustion engine which it is designed to replace. This allows the universal powerhead apparatus to be secured to the land vehicle or tool without requiring other component parts of the device normally positioned about the perimeter of the internal combustion engine to be moved and mounted elsewhere on the frame portion, which could complicate the assembly of the device or the retrofitting of the powerhead apparatus to the device in lieu of an internal combustion engine. In one preferred embodiment both the universal mounting plate and secondary mounting assembly are secured to the apparatus in a manner which does not present an interference problem no matter which mounting component is used to secure the powerhead apparatus to the frame of the land vehicle or tool. In this manner both the universal mounting plate and secondary mounting assembly may be provided with the apparatus without the drawback of the unused one of the two interfering with other components of the land vehicle or tool which are positioned adjacent the apparatus.

The universal powerhead apparatus of the present invention thus allows an electric motor to be secured to a frame portion of a wide variety of land vehicles or tools which were originally designed to be used with a specific make of internal combustion engine without requiring modification to the frame portion of the land vehicle or tool, or repositioning of other components designed to be mounted in close proximity to the internal combustion engine. The universal powerhead apparatus is further readily retrofittable to a wide variety of land vehicles or tools which require either a vertically orientated output drive shaft or a horizontally orientated output drive shaft without significant modification to the apparatus or to the frame portion of the land vehicle or tool. Accordingly, the apparatus of the present invention obviates the need for a manufacturer of various types of land vehicles or tools to manufacture and stock a wide variety of electric motor and mounting assemblies for use with each specific type of land vehicle or tool to be manufactured.

The substitution of the universal powerhead apparatus of the present apparatus further provides the land vehicle or tool with a power means which provides no airborne pollutants or other environmental drawbacks normally associated with internal combustion engines. This, in turn, allows the device to be used in enclosed environments such as factories where the emissions normally produced by an internal combustion engine might give rise to a health concern.

BRIEF DESCRIPTION OF THE DRAWINGS

The various advantages of the present invention will become apparent to one skilled in the art by reading the following specification and subjoined claims and by referencing the following drawings in which:

FIG. 4 is a side view of the apparatus shown in FIG. 2;

FIG. 5 is a bottom view of the apparatus shown in FIG. 2;

FIG. 6 is a rear view of the apparatus of FIG. 2 showing the charger interface assembly electrically coupled with an external battery charger and the interlock assembly key removed;

FIG. 7 is a perspective view of the universal mounting plate secured to a motor of the apparatus;

DETAILED DESCRIPTION OF THE PREFERRED EMBODIMENTS

Figure 1:
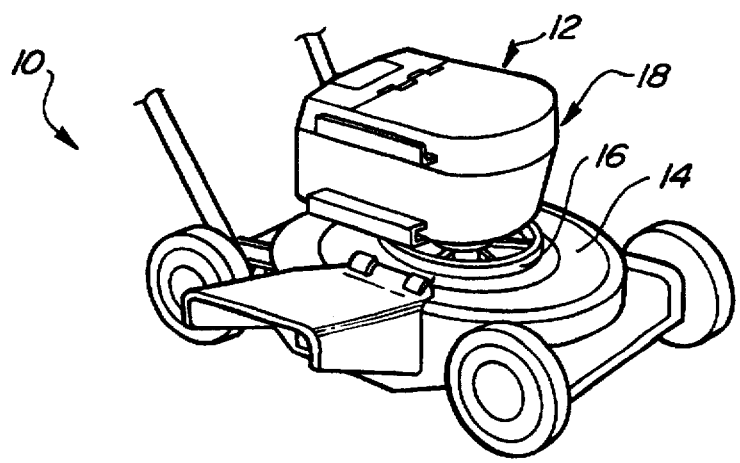
FIG. 1 is a perspective view of a land vehicle in the form of a lawn mower including a universal powerhead apparatus in accordance with a preferred embodiment of the present invention mounted thereon.

Referring to FIG. 1, there is shown a vegetation cutter in the form of a lawn mower 10 incorporating the universal powerhead apparatus 12 in accordance with a preferred embodiment of the present invention. It will be appreciated immediately that while the powerhead apparatus 12 will be described in connection with a lawn mower, that the apparatus is equally well adapted for use with a wide variety of tools requiring a power source for driving a component thereof. Virtually any land vehicle or tool which has been designed for use with a small internal combustion engine is within the intended scope of use of the powerhead apparatus 12.

With further reference to FIG. 1, the powerhead apparatus 12 is adapted to be quickly and easily secured to a frame portion, in this case a deck of the lawn mower 10, to replace a specific make and displacement internal combustion engine originally intended to be mounted on the lawn mower 10. The powerhead apparatus 12 is quickly and easily secured to the deck 14 via a universal mounting member or plate 16 which secures a main body portion 18 rigidly and fixedly to the deck 14. The universal mounting plate 16 and main body portion 18 each have a "footprint" which is substantially similar to the specific model of internal combustion engine which the apparatus is designed to replace. The powerhead apparatus 12 can thus be assembled to the deck 14 by a manufacturer at a factory or other like facility or even retrofitted to the lawn mower 10 by a dealer or other factory authorized service representative or other individual. Since the overall footprint of the powerhead apparatus 12 is substantially similar to that of the specific engine which it is designed to replace, the universal mounting plate 16 may be secured directly to the deck 14 without any modification of the deck 14 such as the drilling of additional holes therein, the use of external adapter plates, etc. The substantially identical footprint further enables the powerhead apparatus 12 to be secured to the deck 14 without requiring other component parts originally supplied with the lawn mower 10 to be relocated on the lawn mower. The substantially identical footprint further allows the retrofitting or original mounting of the powerhead apparatus 12 to the lawn mower 10 to be accomplished quickly, easily and without significant disassembly of the lawn mower 10 except for the originally supplied motor when the apparatus is retrofitted to the lawn mower.

Since the powerhead apparatus 12 includes an electric power source, there are none of the emissions produced by the apparatus that would otherwise accompany an internal combustion engine. Also, since the electric power source of the powerhead apparatus 12 does not require any lubricating oil, fuel filter element or air filter, the overall maintenance of the lawn mower 10 is reduced significantly and the problem of disposing of used oil and other components which might present a hazard to the environment if not disposed of properly is completely eliminated. The internal electric motor of the powerhead apparatus 12 is further significantly more quiet than any internal combustion engine.

Figure 2:
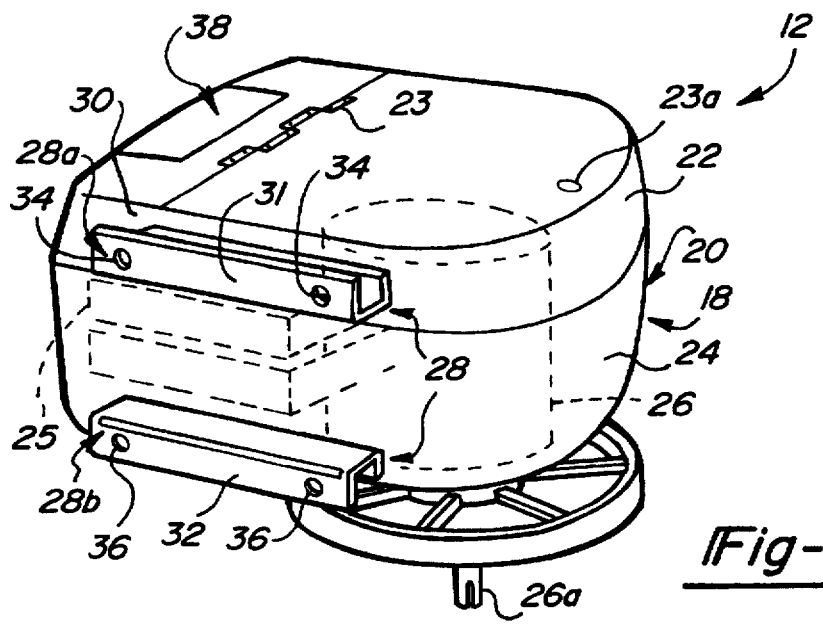
FIG. 2 is an enlarged perspective view of the powerhead apparatus shown in FIG. 1.

With specific reference to FIG. 2, the main body portion 18 of the powerhead apparatus 12 includes a housing 20 having a top member 22 secured via a hinge 23 and a conventional latch 23a to a base portion 24. Within the housing 20 is a vertically orientated electric motor 26 which is secured to the universal mounting plate 16 such that it is rigidly and fixedly supported mostly within the housing 18. The electric motor 26 has an output shaft 26a extending therefrom which is adapted to be operatively coupled to a cutting blade of the lawn mower 10. A plurality of rechargeable batteries are also mounted within the housing 18 for powering the electric motor 26. The motor 26 is commercially available and presently manufactured by the assignee of the present invention and used commercially on a variety of products of the assignee.

The preferred embodiment of the powerhead apparatus 12 shown in FIG. 2 further includes a secondary mounting assembly 28 comprised of a first U-shaped bracket member 28a and a second U-shaped bracket member 28b. The first bracket member 28a is secured such as by threaded fastener and nut assemblies (not shown) to a side wall 30 of the top member 22 to present a vertically orientated mounting surface 31. The second bracket member 28b is similarly secured to the base portion 24 via conventional threaded nut and bolt assemblies (not shown) to present a second, vertically orientated support surface 32. A first pair of apertures 34 are formed in the support surface 32 and a second pair of apertures 36 are formed in the support surface 32 which enable the entire powerhead apparatus 12 to be secured to a horizontally extending frame portion of a land vehicle, such as a snow thrower or tiller, which require a horizontally disposed output shaft to drive the working implement of the vehicle. Thus, the powerhead apparatus 12 can be mounted in either a vertical or horizontal orientation without requiring disassembly of the powerhead apparatus, modification thereto or other manufacturing steps such as drilling, tapping holes, etc., prior to securing the powerhead apparatus to the specific land vehicle or tool. The placement and construction of the secondary mounting assembly 28 components are further such that disassembly does not interfere with other components of the land vehicle mounted in close proximity to the powerhead apparatus since the overall footprint of the apparatus, as seen particularly well in FIGS. 3 and 4, is not substantially increased by the secondary mounting assembly 28.

Figure 3:
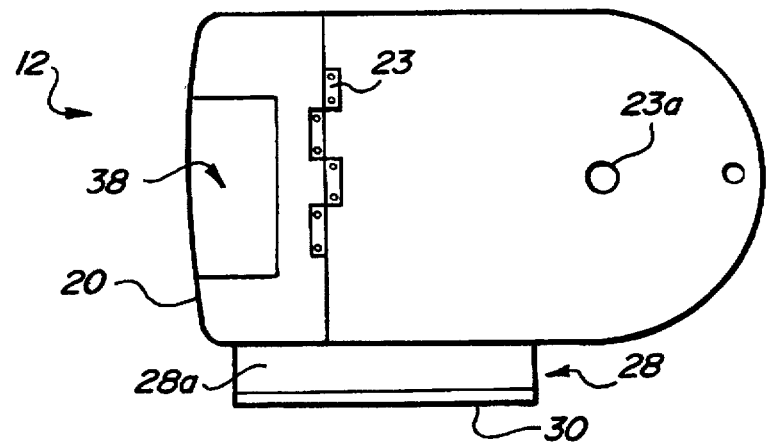
FIG. 3 is a plan view of the apparatus shown in FIG. 2.

With further reference to FIGS. 2, 3 and 6, the powerhead apparatus 12 further includes a removable interlock assembly 38 and a charger interface circuit assembly 40 (FIG. 6). The interlock assembly 38 is the subject of U.S. Pat. No. 5,085,043, assigned to the assignee of the present application, which is also the subject of reissue application Ser. No. 08/156,230, the disclosure of which is hereby incorporated by reference as if set forth fully herein. Briefly, the interlock assembly 38 includes a removable "key" 42 which, when removed as shown in FIG. 6, electrically disables the electric motor 26 such that the motor 26, and thus the powerhead apparatus 12, cannot be operated while an external battery charger 44 is electrically coupled to the charger interface circuit assembly 40. Accordingly, there is no chance of the motor 26 being operated while the battery 25 is being charged by the external charger 44. When the key 42 is inserted into the charger circuit assembly 40, the electric motor 26 is enabled and a charging port 45 is physically blocked by a portion of the key 42. The key 42, however, cannot be coupled while the charger 44 is electrically coupled to the charger assembly 40. Thus, the key 42 can only be inserted once an electrical jack 46 associated with the external charger 44 is uncoupled from the charger circuit assembly 40. As a result, the powerhead apparatus 12 cannot be operated (i.e., the motor 26 turned on) when the battery charger 44 is coupled to the charger assembly 40, while the charger 44 is prevented from being coupled to the powerhead apparatus while the key 42 is inserted. Thus, it is impossible to turn-on the motor 26 of the powerhead apparatus 12 while charging the battery 25 and further impossible to hook-up the charger 44 to the apparatus while the motor 26 is running. The placement of the charger circuit assembly 40 further allows quick and convenient access by the operator without requiring removal of any other components positioned closely adjacent the powerhead apparatus 12.

With reference now to FIG. 7, the universal mounting plate 16 is shown coupled to the electric motor of the powerhead apparatus 12. The universal mounting plate includes a central portion 48 which is separated by an outer perimeter portion 50 by a generally circular inner wall portion 52. A generally circular outer wall 54 further circumscribes the inner wall portion 52. A plurality of upstanding support walls 56 are formed in-between the inner wall portion 52 and the outer wall portion 54 to further add rigidity and strength to the mounting plate 16.

With reference to FIGS. 5, 7, 11 and 12 the outer perimeter portion 50 includes a first plurality of apertures 58 spaced apart generally equidistant from one another while the central portion 48 includes a second plurality of apertures 60 also spaced apart generally equidistant from one another. A central aperture 62 (FIG. 7) is formed at the center of the mounting plate 16.

With brief reference to FIGS. 4–6 and 11, the central aperture 62 allows a lower cover member 27 secured to a flux can 29 of the electric motor 26 to pass through the mounting plate 16. The apertures 60 allow the mounting plate 16 to be coupled to the lower cover member 27 of the motor 26 (shown in FIG. 11) via conventional threaded bolts which extend through apertures 26d (FIGS. 11 and 12) to thus hold the motor 26 rigidly relative to the mounting plate 16. The apertures 58 are positioned to overlay the engine mounting holes (not shown) in the deck 14 of the lawn mower 10 to allow the mounting plate 16 to be secured directly to the deck 14 via threaded bolts and nuts to thus secure the entire apparatus 12 rigidly to the deck 14.

The universal mounting plate 16 is preferably formed from a suitably high-strength material such as metal. Alternatively, a high-strength plastic such as glass filled nylon could be used and the mounting plate 16 formed by well-known injection molding techniques in a suitably shaped injection molding die.

Figure 8:
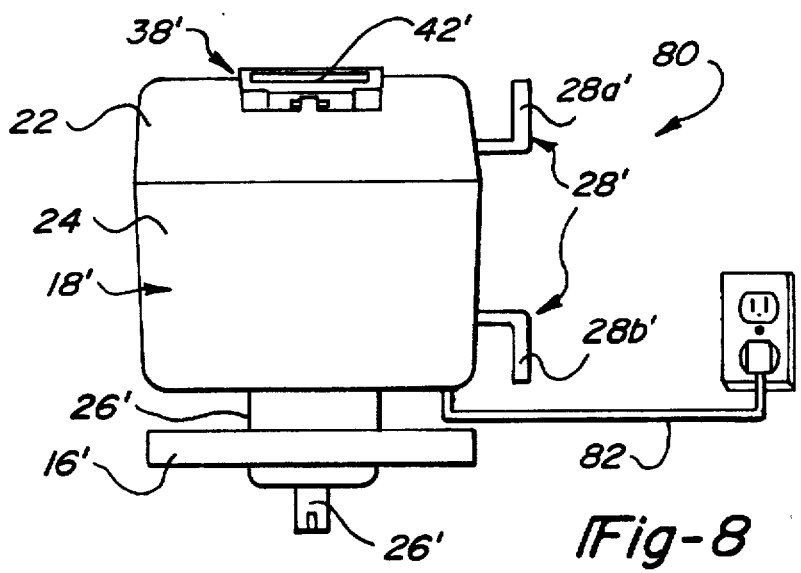
FIG. 8 is a rear view of an alternative preferred embodiment of the present invention adapted to be used with an AC power source showing the apparatus coupled via an AC power cord to an AC receptacle.

Referring now to FIG. 8, there is shown a universal powerhead apparatus 80 in accordance with an alternative preferred embodiment of the present invention. The powerhead apparatus 80 is essentially identical to the apparatus 12 with the exception that it is adapted to be powered directly by an AC power source via a conventional AC power cord 82. The components of the apparatus 80, which are identical to those described in connection with the apparatus 12, have been indicated by like reference numerals with a "prime" superscript designation. With the apparatus 80, the key 42' of the interlock assembly 38', when removed, prevents the powerhead apparatus from being turned on. Once the key 42' is inserted into the interlock assembly 38', the apparatus may be turned on by a suitable on/off switch disposed preferably on a handle portion (not shown) of the lawn mower 10 shown in FIG. 1.

Figure 9:
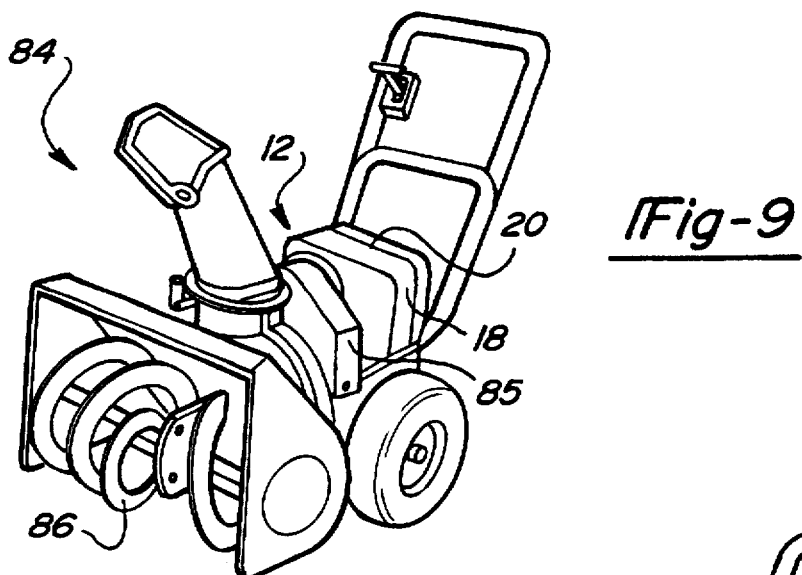
FIG. 9 is a perspective view of a snow thrower incorporating the powerhead apparatus of the present invention.

Referring briefly to FIG. 9, the powerhead apparatus 12 is shown forming a power source for a snow thrower 84. The apparatus 12 is mounted such that its output shaft (not visible) is mounted in a horizontal orientation to a drive mechanism 85 as needed to drive the snow throwing implement 86 of the snow thrower 84.

Figure 10:
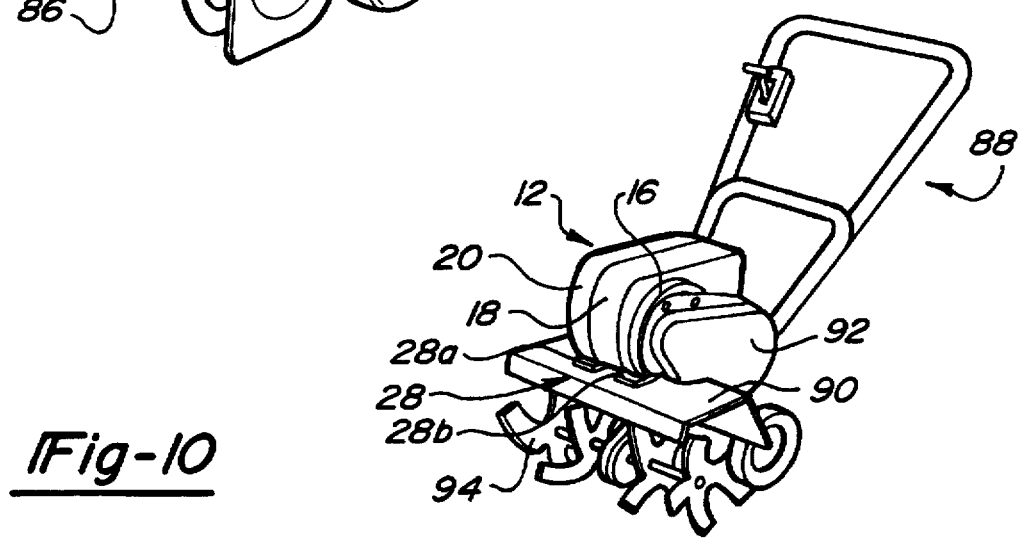
FIG. 10 is a perspective view of a tiller incorporating the powerhead apparatus of the present invention.
Figure 11:
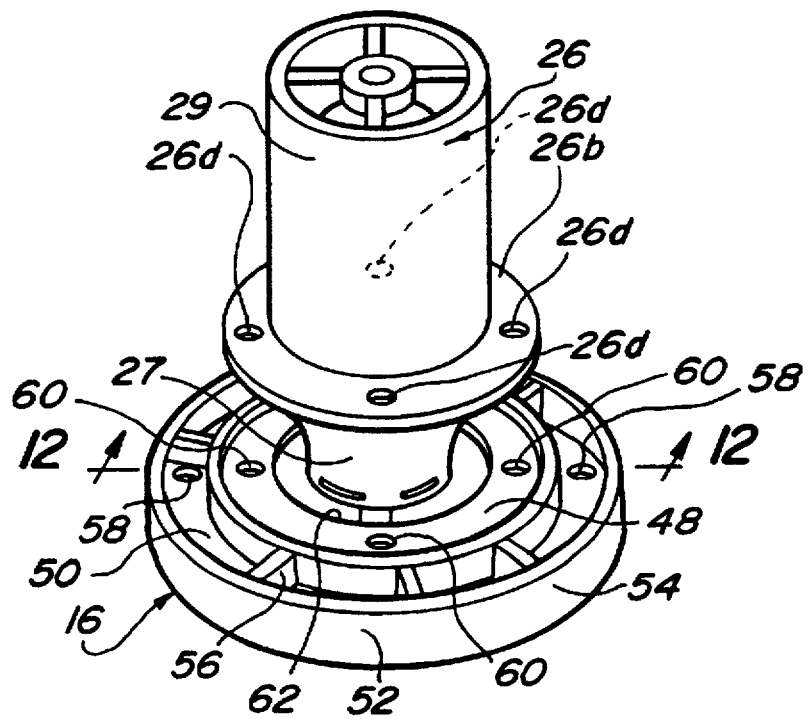
FIG. 11 is an exploded perspective view of the electric motor of the powerhead apparatus uncoupled from the universal mounting plate.
Figure 12:
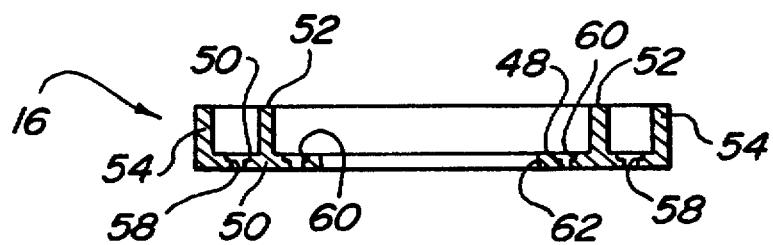
FIG. 12 is a cross-sectional view of the universal mounting plate taken in accordance with section line 12—12 in FIG. 11.

With brief reference to FIG. 10, the powerhead apparatus 12 is shown mounted in a horizontal orientation to drive a tiller 88. The brackets 28a and 28b of the secondary mounting assembly 28 are secured directly to a frame portion 90 of the tiller 88. The output shaft (not shown) of the powerhead apparatus 12 extends horizontally into a drive assembly 92 of the tiller 88, which drives a tilling implement 94 rotationally about a horizontally extending axis of rotation.

It will thus be appreciated that the preferred embodiments of the present invention described herein provide for an electric powerhead apparatus which may be powered by batteries or directly from an AC power source. The preferred embodiments of the present invention are further adapted to be quickly and easily secured to a frame portion of a land vehicle, tool or pump, as well as virtually any form of implement which would otherwise be used with an internal combustion engine, without requiring significant modification of the frame portion or rearrangement of other component parts originally designed to be in close proximity to the power source. The preferred embodiments of the powerhead apparatus are further adapted to be secured directly to a frame portion of a land vehicle, tool or pump during factory assembly or retrofittable to the device to replace an internal combustion engine. Accordingly, the powerhead apparatus of the present invention allows an electric power source to be used in place of an internal combustion engine on a wide variety of land vehicles or tools without significant modification to the frame portion of such vehicle or other components thereof. The powerhead apparatus of the present invention further produces none of the undesirable airborne pollutants normally produced by internal combustion engines nor require the periodic maintenance typically required for gasoline powered engines.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A universal powerhead apparatus adapted to be readily secured to a single tool selected from a plurality of differing tools, said apparatus comprising:
   an electric motor for providing power to said tool or an implement thereof, said electric motor having an output member adapted to be releasably operatively connected to said tool or said implement thereof for driving said tool or said implement thereof;
   a battery for powering said electric motor;
   a housing for at least substantially enclosing said electric motor and said battery; and
   a mounting member connected to said housing and operable to secure said housing to any one of said plurality of differing tools.

2. The apparatus of claim 1, wherein said mounting member comprises a universal mounting member operably coupled to said electric motor for mounting said apparatus to said tool without modification to said tool.

3. The apparatus of claim 2, wherein the universal mounting member is adapted to be retrofitted to said tool in place of an internal combustion engine.

4. A universal powerhead apparatus adapted to be secured to a single tool selected from a plurality of differing tools, said apparatus comprising:
   an electric motor for providing power to said tool or an implement thereof, said electric motor having an output member adapted to be releasably operatively connected to said tool or said implement thereof for driving said tool or said implement thereof;
   a housing for substantially enclosing said electric motor; and
   said apparatus being adapted to be secured to a portion of said tool or said implement thereof in place of an internal combustion engine without requiring substantial modification of said tool or said implement thereof; and
   a mounting member connected to said housing for securing said apparatus to said tool or said implement thereof, said mounting member being adapted to secure said apparatus to any one of said plurality of differing tools.

5. A universal powerhead apparatus adapted to be secured to a tool or an implement thereof, having a specific make and displacement of an internal combustion engine to replace said internal combustion engine, wherein said internal combustion engine is manufactured by a predetermined source and has a predetermined output or displacement, and is releasably operatively connected to said tool or said implement thereof, said powerhead apparatus comprising:
   a housing;
   an electric motor disposed within said housing, said electric motor having an output member adapted to be releasably operatively connected to said tool or said implement thereof for driving said tool or said implement thereof;
   a universal mounting plate adapted to be fixedly secured to a portion of said motor, said universal mounting plate further being adapted to be fixedly secured to a frame portion of said tool or said implement thereof so as to align with a mounting portion on said frame portion of said tool or said implement thereof without modification to said frame portion; and
   wherein said housing has outer dimensions similar to those of said internal combustion engine so as to be readily securable to said frame portion without modification to said frame portion.

6. The apparatus of claim 5, further comprising a rechargeable battery disposed within said housing for powering said electric motor.

7. The apparatus of claim 6, further comprising:
   a charger interface assembly electrically coupled with said battery and adapted to be electrically coupled to an external battery charger to allow said battery to be recharged; and
   an interlock assembly operably associated with said charger interface assembly for preventing said external battery charger from being electrically coupled to said charger interface assembly while said electric motor is operating, and for preventing said electric motor from operating while said charger interface assembly is electrically coupled to said external battery charger.

8. The apparatus of claim 6, wherein said universal mounting plate comprises:
   a first portion for enabling one of said electric motor and said housing assembly to be fixedly secured to said universal mounting plate;
   a central aperture for allowing a portion of an output shaft of said electric motor to pass therethrough; and
   a second portion for enabling said universal mounting plate to be fixedly secured to said frame portion of said tool without modification to said frame portion.

9. The apparatus of claim 5, further comprising:
   a secondary mounting assembly for securing an output shaft of said electric motor in an orientation which is rotated approximately 90° from that position which said output shaft is orientated when said universal mounting plate is used to secure said electric motor to said frame portion of said tool.

10. The apparatus of claim 9, wherein said secondary mounting assembly includes at least one bracket member fixedly secured to said housing for allowing said housing, and therefore said electric motor, to be mounted in a position rotated approximately 90° from a position said housing and said electric motor would assume when secured to said tool via said universal mounting plate.

11. A electric powerhead apparatus securable to a tool or an implement thereof to replace of an internal combustion engine of said tool or said implement thereof, with little or no modification to said tool or said implement thereof, said internal combustion engine being releasably operatively connected to said tool or said implement thereof, said apparatus comprising:
   an electric motor, said electric motor having an output member adapted to be releasably operatively connected to said tool or said implement thereof for driving said tool or said implement thereof; and
   a universal mounting member releasably connected to said electric motor having a portion adapted to cooperate with existing mounting structure on said tool or said implement thereof to mount said electric motor to said tool or said implement thereof to support said electric motor fixedly relative to said tool or said implement thereof.

* * * * *